United States Patent [19]

Seppamaki

[11] E Patent Number: Re. 32,671

[45] Reissued Date of Patent: May 24, 1988

[54] FLUE CONTROL DEVICE

[76] Inventor: John W. Seppamaki, 3768 Socorro, Grandville, Mich. 49418

[21] Appl. No.: 16,553

[22] Filed: Feb. 19, 1987

Related U.S. Patent Documents

Reissue of:

[64] Patent No.: 4,499,891
Issued: Feb. 19, 1985
Appl. No.: 527,329
Filed: Aug. 29, 1983

[51] Int. Cl.[4] ..... F23L 3/00

[52] U.S. Cl. ..... 126/292; 126/307 A; 138/37; 138/39

[58] Field of Search ..... 126/285 R, 292, 297, 126/307 R, 307 A; 138/37, 39

[56] References Cited

U.S. PATENT DOCUMENTS

| | | | |
|---|---|---|---|
| 340,500 | 4/1886 | Fraser | 126/292 |
| 346,794 | 8/1886 | Whitmarsh | 237/53/ |
| 403,672 | 5/1889 | Humphrey | 126/297 |
| 1,319,621 | 10/1919 | Roughen | 165/103 |
| 1,328,565 | 1/1920 | Howard | 126/292 |
| 1,417,987 | 5/1922 | Griffith | 165/103 |
| 1,438,611 | 12/1922 | Ryerson | 126/307 X |
| 1,794,724 | 3/1931 | Meyer | 126/307 A |
| 1,837,581 | 12/1931 | Peterson | 126/312 |
| 1,840,628 | 1/1932 | Howle | 126/307 A |
| 1,891,600 | 12/1932 | Lancaster | 126/307 A |
| 1,963,073 | 6/1934 | Butler | 126/307 A |
| 1,966,360 | 7/1934 | Shaffer | 237/55 |
| 1,971,336 | 8/1934 | Butler | 126/307 A |
| 2,180,212 | 11/1939 | Morrow | 126/307 A |
| 2,222,663 | 11/1940 | Handley | 126/307 A |
| 2,244,936 | 6/1941 | Bird | 126/312 |
| 2,359,465 | 10/1944 | Coburn | 126/307 A |
| 2,611,361 | 9/1952 | Lockhart | 126/307 A |
| 2,734,501 | 2/1956 | Fauser | 126/307 A |
| 2,735,385 | 2/1956 | Ascentis | 126/307 A |
| 3,736,961 | 6/1973 | Walsh | 138/38 |
| 4,187,833 | 2/1980 | Zahora | 126/307 A |
| 4,291,671 | 9/1981 | Senne | 126/297 |
| 4,320,869 | 3/1982 | Ebert | 126/307 A |
| 4,373,510 | 2/1983 | Smith | 126/307 A |

*Primary Examiner*—Samuel Scott
*Assistant Examiner*—Allen J. Flanigan
*Attorney, Agent, or Firm*—John A. Waters

[57] ABSTRACT

A flue control device for slowing the rate at which heated exhaust gases rise through an exhaust stack comprises a cylindrical housing enclosed by end caps, with an offset inlet and outlet being positioned in opposite end caps. The interior of the housing defines a baffle chamber, and a baffle mechanism is positioned in the baffle chamber between the inlet and outlet. The baffle mechanism comprises two overlapping plates, each plate having a prominent flange extending in an upstream direction relative to the flow of gases through the baffle chamber. The flanges interrupt and slow the swirling circular flow of gases as they pass through the baffle chamber. The baffle and housing are of a size such that the cross-sectional area of the restricted portion of the housing adjacent the baffle is at least as large as the cross-sectional area of the exhaust stack. Thus, the flue control device changes the direction of the gases and disrupts laminar or smooth flow of the gases to slow the flow of exhaust gases through the exhaust stack, without necessarily restricting such flow.

13 Claims, 2 Drawing Sheets

FLUE CONTROL DEVICE

Matter enclosed in heavy brackets [ ] appears in the original patent but forms no part of this reissue specification; matter printed in italics indicates the additions made by reissue.

*This application is a reissue of Ser. No. 527,329, filed 8/29/83, now U.S. Pat. No. 4,499,891.*

BACKGROUND OF THE INVENTION

1. Field of the Invention

This invention relates to a flue control device and more particularly to a non-restrictive flue control device wherein a baffle mechanism having flanges extending in an upstream direction disrupt the smooth flow of gases as well as change the direction of flow of the gases in order to slow the flow of gases through the exhaust stack.

2. Description of Prior Art

In a gas furnace, heated combustion gases warm the air being circulated throughout the building and then are exhausted through an exhaust stack or flue. A cause of inefficiency in such a system is the discharge of combustion gases at too fast a rate, before the combustion gases have had a chance to transfer a maximum amount of their heat to the air being circulated throughout the rooms. The rate at which combustion gases are exhausted is dependent upon a number of factors, one of which is the diameter of the exhaust stack. Other factors are dependent on the nature of the dwelling, conditions external to the dwelling, and a number of other individual factors, such that the rate of gas exhaust can vary widely amoung different houses, even though the houses may have the same type of heating system.

Various types of devices have been developed in order to improve heating efficiency by slowing the rate at which combustion gases are exhausted through an exhaust stack. One type of device is a flue restricting device, which essentially is a baffle that restricts or narrows the cross-sectional area of the exhaust flue. Such a device generally is movable to restrict the flue only when the furnace is not operating and to open fully when the furnace is operating. This type of device thus has no effect on furnace operation during the time of greatest heat loss. A flue restricter that restricts the area of the exhaust flue during normal operation can be in violation of applicable fire codes.

Another type of device for slowing the flow of exhaust gases during normal furnace operation employs a baffle mechanism adjacent an enlarged baffle chamber in the exhaust stack. The baffle mechanism causes a change in direction of the gases as they flow around the baffle but the enlarged chamber prevents actual constriction of the flue size. This is called a non-restrictive flue control device.

These devices cause some retardation of the gas flow rate due to the change in linear direction of the gases. However, gases also swirl in a circular pattern as they flow and a simple flat baffle does little to disrupt this swirling action. To impede the swirling action, some nonrestriction devices have incorporated small lips on the baffle, but the performance is still less than desirable.

An object of the present invention is to provide a simple and yet effective flue control device that changes the longitudinal direction of the gases and disrupts the swirling pattern of gas flow in a manner that maximizes the retardation of gas flow in widely varying conditions without creating dangerous exhaust flow conditions.

Another object of the present invention is to provide a flue control device of this nature that is safe and effective and inexpensive to construct yet can be modified to accommodate differing flue conditions and differing installations.

SUMMARY OF THE INVENTION

In accordance with the present invention, a flue control device for slowing the rate at which heated exhaust gases pass through an exhaust stack comprises a housing including a central sleeve portion with closed ends, with the housing including an inlet in one end and an outlet at the opposite side of the housing, the inlet and outlet being formed so as to fit into a section of exhaust stack. The sleeve has an internal cross-sectional area that is substantially larger than the internal cross-sectional area of the exhaust stack, with the internal portion of the housing defining a baffle chamber. A baffle mechanism is mounted in a transverse position in the baffle chamber between the inlet and outlet. This causes the exhaust gases to be directed in a non-linear path around the baffle mechanism through a portion of the baffle chamber on the other side of the sleeve. The sleeve and baffle mechanism are of a size such that the cross-sectional area of the baffle chamber is at least as large as the cross-sectional area of the exhaust stack. This causes the flue control device to control the direction but not to restrict the flow of exhaust gases.

The baffle mechanism comprises a first plate with an outer edge that fits against and is attached to the internal surface of the sleeve. An inner edge of the first plate extends across the baffle chamber. The inner edge has a prominent flange that extends away from the baffle mechanism in an upstream direction toward the inlet side of the device.

The baffle mechanism also includes a second plate fastened to the inner edge of first plate and extending further into the baffle chamber than the first plate. The second plate has an inner edge with a flange extending outwardly therefrom in an upstream direction toward the housing inlet. The flanges on the first and second plates are spaced apart and interrupt the swirling, circular flow of the gases as they pass through the baffle chamber. The change in flow direction and disrupted flow pattern serve to slow the outward flow of exhaust gases through the exhaust stack. The position of the second plate can be permanently adjusted to suit individual applications so that the baffle mechanism blocks from 40% to about 60% of the area of the baffle chamber for a typical flue control device employed with a standard size flue pipe.

In a typical furnace installation, an exhaust stack is about five inches in diameter. The flue control device of the present invention desirably is about ten inches in diameter and the baffle mechanism extends about half way across the sleeve. Desirably the turbulence-inducing flanges are 0.5 inches to 0.75 inches long. Preferably, the flange extending further into the sleeve is about 0.75 inches long and the other flange is about 0.5 inches long.

The flue control device of the present invention is a simple yet effective non-restrictive device for interrupting not only the linear flow of gases through the exhaust stack but also the swirling circular flow of gases as they pass through the exhaust stack. The result in flow in the flue control device is turbulent, and this slows the flow of gases through the exhaust stack.

These and other advantages of the present invention will hereinafter appear and for purposes of illustration but not of limitation a preferred embodiment of the present invention is described below and shown in the appended drawings.

DETAILED DESCRIPTION OF PREFERRED EMBODIMENTS

Figure 1:
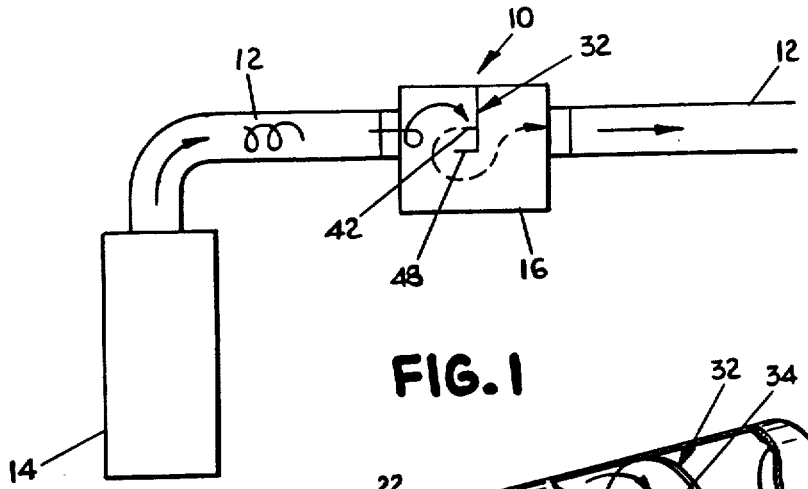
FIG. 1 is a schematic view of a furnace employing the flue control device of the present invention.

Referring to the drawings, a flue control device 10 constructed in accordance with the present invention is shown mounted in a conventional exhaust stack or flue 12 in order to convey combustion gases from a gas-fired furnace 14. As shown in the drawings, the exhaust gases follow a circular swirling motion as they pass up the exhaust flue.

Figure 2:
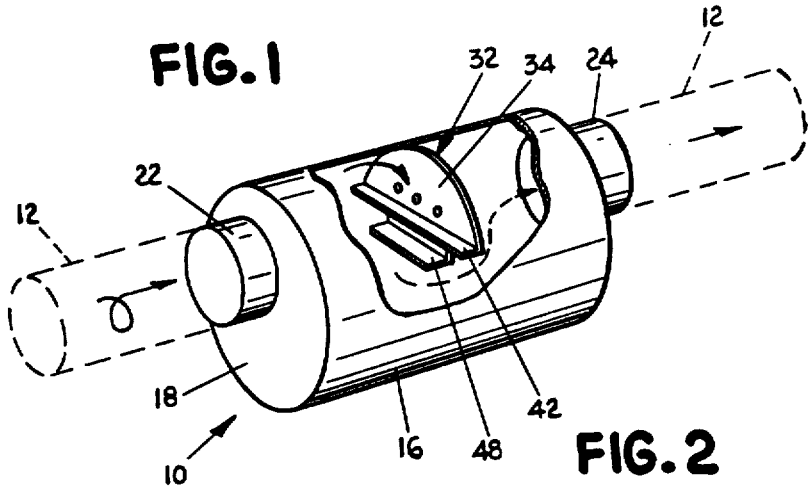
FIG. 2 is a perspective view of the flue control device of the present invention, with a portion of the housing being broken away to show the interior components.
Figure 3:
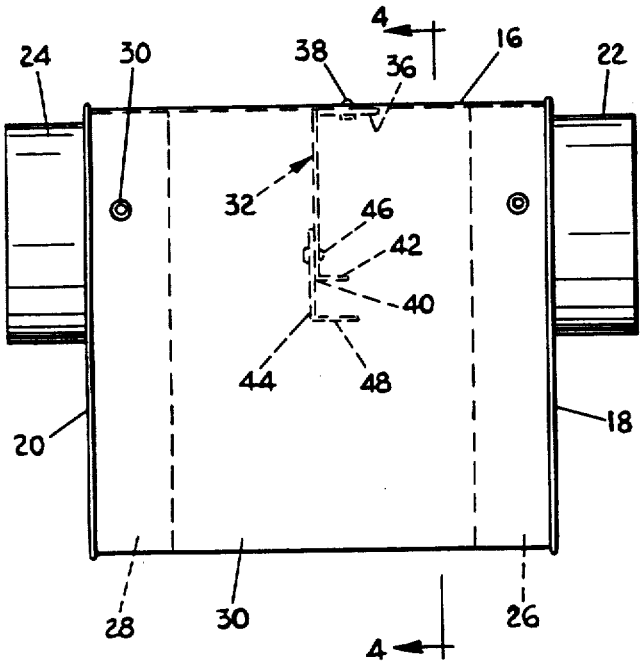
FIG. 3 is a side elevational view of the flue control device of the present invention.
Figure 4:
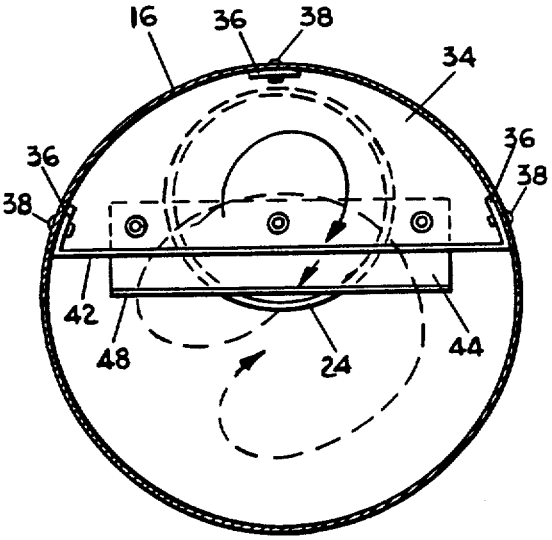
FIG. 4 is a cross-sectional view taken along lines 4—4 of FIG. 3.

Referring to FIGS. 2–4, flue control device 10 comprises a housing formed of a cylindrical sleeve 16 with open ends being covered by end caps 18 and 20. The end caps comprise flat plates with offset circular openings therein being fitted with raised outlet and inlet collars 22 and 24, respectively. The openings desirably are formed on one side of the end caps and are positioned in axial alignment with each other. The raised collars interfit with the exhaust flue in which the device is mounted. Collar 22 is the inlet of the device and collar 24 is the outlet of the device. The end caps 18 and 20 have inwardly extending annular flanges 26 and 28 which fit inside sleeve 16. These flanges are attached to the sleeve by means of rivets 30 or the like.

Sleeve 16 desirably has a cross-sectional area that is at least twice the cross-sectional area of the exhaust flue in order to insure that the exhaust gases will not be restricted. Preferably the diameter of the sleeve is approximately twice the diameter of the exhaust flue. For a standard five inch diameter exhaust flue, the sleeve diameter preferably is about ten inches. This provides a baffle chamber 30 inside the sleeve and end caps that is more than twice the cross-sectional area of the exhaust flue.

The interior of the baffle chamber is provided with a transverse baffle mechanism 32 attached at right angles to the inner walls of the sleeve. Baffle mechanism 32 comprises a first plate 34 having an arcuate outer surface that mates with the inner surface of the sleeve. Tabs 36 extend at right angles from the arcuate surface of plate 34 and are attached by rivets 38 or the like to the side of the sleeve in order to hold the baffle in transverse position in the middle of the sleeve in between the device inlet and outlet. Baffle 34 includes an outer edge 40 extending across the sleeve, and a flange 42 extends perpendicularly away from the plate in the direction of the inlet to the baffle chamber. Flange 42 runs all the way across from one side of the sleeve to the other and desirably extends outwardly 0.5 to 0.75 inches from the first plate. In the preferred example shown, the flange is 0.5 inches long. The baffle extends inwardly into the interior of the baffle chamber a sufficient distance to cause a major diversion of gas flow around the baffle. This is about 40% of the way across the chamber or about four inches in a ten-inch sleeve.

A second plate 44 is attached to the first plate and extends further into the baffle chamber. The second plate is attached by rivets 46 or the like to the first plate. The second plate extends another 10% to 20% of the distance across the chamber (about an inch or two beyond the first plate in a ten-inch chamber). In most installations an extension of one inch is preferred. The plate terminates in a flange 48 that also extends in the direction of the inlet to the baffle chamber. Flange 48 preferably is about 0.5 to 0.75 inches long and desirably is about 0.75 inches long. It is preferred that flange 48 be somewhat longer than flange 42. Both flanges extend in a parallel direction. These flanges interrupt the swirling, circular movement of the gases through the baffle chamber and induce turbulent flow to these gases. The turbulent flow substantially reduces the rate at which the gases flow through the device and thereby improves the retention of heat in the furnace.

One of the advantages of using a first and second plate, in addition to the fact that they provide a means for employing two outwardly extending flanges from the baffle mechanism, is that the position of the second plate can be adjusted with respect to the first plate for the particular circumstances present in any particular furnace environment. This is done by punching out the rivets 46, adjusting the position of the second plate and inserting new rivets in order to hold the plates together. With the adjustment means provided, the total baffle can be adjusted to block about 40–60% of the area of the baffle chamber. This permanent type of adjustment feature is necessary, because most applicable regulations prohibit use of flue devices that are manually adjustable once the device is installed. The type of adjustment provided by the present invention maximizes the safety of the device, while providing sufficient flexibility to accommodate the differing flue conditions in differing furnaces.

The present invention employs conventionally available inexpensive materials and provides a simple and inexpensive flue control device that is exceptionally effective in retaining heat in the furnace and slowing the flow of exhaust gases through the exhaust flue. Desirably the various components are formed of 24-gauge galvanized steel.

Figure 5:
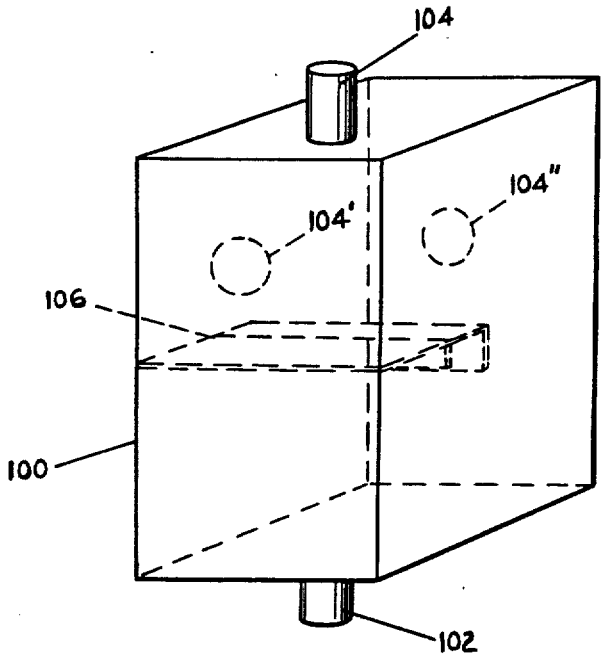
FIG. 5 is a perspective view of a second embodiment of the present invention.

A second embodiment of the present invention is shown in FIG. 5. This embodiment employs a rectangular housing 100 with an inlet 102 in one end and an outlet 104 on the opposite side of the housing. The outlet may be in the other end as in the prior embodiment with the inlet and outlet being offset and in line. Alternatively, for unusual furnace configurations or space limitation, the outlet could be formed in the sides of the housing, as shown in phantom by outlets 104′ and 104″. Baffle 106 is constructed in a manner similar to the previous embodiment.

For a typical installation using five inch flue pipe the housing is eight inches wide, ten inches high, and ten inches deep (FIG. 5 orientation), with the baffles extending about half way across the chamber (about five inches), the baffle flanges being separated by about one-half inch.

This embodiment permits installation in spaces where the other embodiment will not fit.

It should be understood that the foregoing construction represents merely an exemplary embodiment of the present invention and that various changes and modifications in the details of construction of this embodiment may be made without departing from the spirit and scope of the present invention, which is defined in the appended claims.

The embodiments of the invention in which an exclusive property or privilege is claimed are defined as follows:

1. A flue control device for slowing the rate at which heated exhaust gases pass through an exhaust stack comprising:

a housing including a central sleeve portion with closed ends, the housing including an inlet in one end and an outlet at the opposite side of the housing, with the inlet and outlet being formed so as to fit into a section of exhaust stack, the sleeve having an internal cross-sectional area that is substantially larger than the internal cross-sectional area of the exhaust stack, the interior of the housing defining a baffle chamber;

a baffle mechanism mounted in a transverse position in the baffle chamber between the inlet and outlet, such that exhaust gases are directed in a non-linear path around the baffle mechanism in passing through the baffle chamber, the baffle mechanism comprising a transverse first plate having an outer edge that fits against and is attached to the internal surface of the sleeve and having an inner edge that extends across the baffle chamber; with a prominent flange extending outwardly therefrom in a direction toward the housing inlet, the baffle mechanism further including a second plate fastened to the first plate at the inner edge thereof and extending further into the baffle chamber than the first plate, the second plate having an inner edge extending at least part way across the baffle chamber, with a prominent flange extending outwardly therefrom in the direction of the housing inlet, the flanges on the first and second plates being spaced apart and generally parallel, the flanges interrupting the swirling, circular flow of gases as they pass through the baffle chamber and causing the gas flow pattern to become disrupted, the change in flow direction and disrupted flow pattern serving to slow the outward flow of exhaust gases through the exhaust stack.

2. A flue control device according to claim 1 wherein the interior cross-sectional area of the housing is at least twice the interior cross-sectional area of the exhaust stack and the baffle mechanism restricts the interior cross-sectional area of the housing to no less than the cross-sectional area of the exhaust stack.

3. A flue control device according to claim 1 wherein the first and second plates are riveted together and overlap a sufficient amount such that the size of the baffle mechanism can be adjusted by removing the rivets, repositioning the plates and re-riveting them together, thereby providing an adjustment means for permanently adjusting the size of the baffle mechanism to suit a particular flue condition.

4. A flue control device according to claim 3 wherein the plates are sized and overlap such that baffle mechanism can be permanently adjusted to restrict the cross-sectional area of the baffle chamber to a range of about forty to sixty percent (40–60%) of the interior cross-sectional area of the housing.

5. A flue control device according to claim 1 wherein the flanges extend outwardly from the plates a distance of at least about 0.5 inches (1.27 cm).

6. A flue control device according to claim 5 wherein the flange on the second plate extends outwardly further than the flange on the first plate and extends outwardly a distance of at least about 0.75 inches (1.90 cm).

7. A flue control device according to claim 1 wherein the exhaust stack has an internal diameter of about five (5) inches (12.7 cm) and the sleeve has a circular cross-section with an internal diameter of about ten (10) inches (25.4 cm), and the baffle mechanism is permanently adjustable by repositioning the second plate on the first plate to restrict the internal cross-sectional area of the baffle chamber to forty to sixty percent (40–60%) of its full and unimpeded cross-sectional area.

8. A flue control device according to claim 1 wherein the housing has a rectangular cross section, the inlet is formed in one end of the housing *or in a side or top of the housing adjacent the one end*, and the outlet is formed in the other end of the housing or in a side *or top* of the housing adjacent the other end, with the baffle mechanism being positioned between the inlet and outlet, whereby the flue control device can fit in tight space limitations and can be attached to unusual flue pipe configurations.

9. A flue control device according to claim 1 wherein the sleeve is generally cylindrical and the inlet and outlet are formed in opposite ends of the housing and in alignment with each other, the inlet and outlet being offset to one side of the housing, the baffle having a curved outer side that abuts the housing and being positioned between the inlet and outlet.

10. A non-restrictive flue control device for slowing the rate at which furnace exhaust gases are conveyed through an exhaust stack comprising:

a closed housing having an inlet and outlet at opposite ends thereof, the interior of the housing forming a baffle chamber, the inlet and outlet being formed such that the flue control device can be inserted in a section of the furnace exhaust flue; and baffle means mounted in the baffle chamber for diverting the exhaust gases into a non-linear path around the baffle means in the housing while at the same time disrupting any circular, swirling movement of the gases and rendering such gas flow turbulent, the baffle means comprising a baffle plate positioned between the inlet and outlet in a position generally transverse to a straight line between the inlet and outlet, at least one prominent flange extending in a generally perpendicular direction from the baffle plate in an upstream direction relative to the gas flow direction through the flue control device, the flange being about one-half inch (1.27 cm) wide or wider and extending the width of the baffle plate, the flange being positioned such that the flange is generally transverse to the circular, swirling direction of the gases, so as to disrupt such circular, swirling movement as the gases are diverted around the baffle plate, the housing being sufficiently large and the baffle means being sufficiently small that the baffle means does not restrict the internal cross-sectional area of the housing to a size smaller than the internal cross-sectional area of the exhaust flue, the baffle means further comprising a second plate at least partially overlapping the baffle plate and attached thereto by fasteners that are at least forcibly removable, the second plate having a prominent flange thereon extending in the same direction as the flange on the baffle plate, the position of the second plate on the baffle plate being adjustable by removing the fasteners, adjusting the relative plate positions and attaching the plates together with fasteners, the adjustment of plate positions making it possible to modify the amount of restriction provided by the baffle means.

11. A non-restrictive flue control device for slowing the rate at which furnace exhaust gases are conveyed through an exhaust stack comprising:

a closed housing having an inlet and outlet at opposite ends thereof, the interior of the housing forming a baffle chamber, the inlet and outlet being formed such that the flue control device can be inserted in a section of the furnace exhaust flue; and baffle means mounted in the baffle chamber for diverting the exhaust gases into a non-linear path around the baffle means in the housing while at the same time disrupting any circular, swirling movement of the gases and rendering such gas flow turbulent, the baffle means comprising a first plate positioned between the inlet and outlet in a position generally transverse to a straight line between the inlet and outlet, at least one prominent flange extending from the first plate in an upstream direction relative to the gas flow direction through the flue control device, the flange being positioned such that the flange is generally transverse to the circular, swirling direction of the gases so as to disrupt such circular, swirling movement as the gases are diverted around the first plate, the baffle means further comprising a second plate at least partially overlapping the first plate and attached thereto by fasteners that are at least forcibly removable, the second plate having a prominent flange thereon extending in the same direction as the flange on the first plate, the position of the second plate on the first plate being adjustable by removing the fasteners, adjusting the relative plate positions and attaching the plates together with fasteners, the adjustment of plate positions making it possible to modify the amount of restriction provided by the baffle means, the housing being sufficiently large and the baffle means being sufficiently small that the baffle means does not restrict the internal cross-sectional area of the housing to a size smaller than the internal cross-sectional area of the exhaust flue.

*12. A flue control device for slowing the rate at which furnace exhaust gases are conveyed through an exhaust stack comprising:*

*a housing having an inlet and outlet, the interior of the housing forming a closed baffle chamber, the inlet and outlet being formed such that the flue control device can be inserted in a section of the furnace exhaust flue; and*

*baffle means mounted in the baffle chamber for diverting the exhaust gases into a non-linear path around the baffle means in the housing while at the same time disrupting any circular, swirling movement of the gases and rendering such gas flow turbulent, the baffle means comprising a first plate positioned transversely between the inlet and outlet, at least one prominent flange extending from the first plate in an upstream direction relative to the gas flow direction through the flue control device, the baffle means further comprising second plate means extending further into the baffle chamber from an inner edge of the first plate, the second plate means having a prominent flange thereon spaced apart from and extending in the same general direction as the flange on the first plate, the flanges interrupting the swirling, circular flow of gases as they pass through the baffle chamber and causing the gas flow pattern to become disrupted, thus serving to slow the outward flow of exhaust gases through the exhaust stack.*

*13. A flue control device according to claim 12 wherein the position of the second plate means is adjustable to modify the amount of restriction provided by the baffle means.*

* * * * *